United States Patent
Pandian et al.

(10) Patent No.: US 10,481,800 B1
(45) Date of Patent: Nov. 19, 2019

(54) NETWORK DATA MANAGEMENT PROTOCOL REDIRECTOR

(71) Applicant: EMC IP Holding Company LLC, Hopkinton, MA (US)

(72) Inventors: Ilavarasu Pandian, San Jose, CA (US); Moiz Haidry, Campbell, CA (US); Sri Harsha Koppaka, San Jose, CA (US); Hsing Yuan, Santa Clara, CA (US); Hymanand Nellore, Cupertino, CA (US); Mandeep Singh Arora, Milpitas, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 175 days.

(21) Appl. No.: 15/582,449

(22) Filed: Apr. 28, 2017

(51) Int. Cl.
*G06F 3/06* (2006.01)
*H04L 29/08* (2006.01)
*G06F 11/34* (2006.01)
*H04L 12/24* (2006.01)

(52) U.S. Cl.
CPC ............ *G06F 3/061* (2013.01); *G06F 3/0635* (2013.01); *G06F 11/3433* (2013.01); *H04L 67/1023* (2013.01); *G06F 3/067* (2013.01); *H04L 41/0823* (2013.01); *H04L 67/1002* (2013.01); *H04L 67/1097* (2013.01)

(58) Field of Classification Search
CPC ........ G06F 3/061; G06F 3/0635; G06F 3/067; G06F 11/3433; H04L 67/1023; H04L 67/1002; H04L 67/1097; H04L 41/0823
See application file for complete search history.

(56) References Cited

U.S. PATENT DOCUMENTS

| | | | | |
|---|---|---|---|---|
| 7,797,284 | B1 * | 9/2010 | Chellappa | G06F 11/1464 707/668 |
| 7,890,626 | B1 * | 2/2011 | Gadir | G06F 11/2023 709/223 |
| 8,099,572 | B1 * | 1/2012 | Arora | G06F 13/28 707/640 |
| 8,200,638 | B1 * | 6/2012 | Zheng | G06F 11/1469 707/679 |
| 8,225,057 | B1 * | 7/2012 | Zheng | G06F 11/1458 711/114 |
| 9,648,105 | B2 * | 5/2017 | Nallathambi | G06F 16/27 |
| 9,774,672 | B2 * | 9/2017 | Nallathambi | H04L 67/1095 |

(Continued)

OTHER PUBLICATIONS

Werstein, et al. "Load Balancing in a Cluster Computer", International Conference on Parallel and Distributed Computing Applications and Technologies, Dec. 2006, 9 pages.

(Continued)

*Primary Examiner* — Blake J Rubin
(74) *Attorney, Agent, or Firm* — Amin, Turocy & Watson, LLP

(57) ABSTRACT

A network attached storage (NAS) cluster can run with a set of heterogeneous hardware nodes, where not all nodes in the cluster have access to the same target connectivities. In one aspect, network data management protocol (NDMP) sessions can be redirected from a first node of the NAS cluster to a second node of the NAS cluster to balance NDMP load across the NAS cluster and improve resource utilization across cluster. Further, the NDMP load can be actively monitored to balance it continuously to increase resource utilization efficiency.

20 Claims, 10 Drawing Sheets

(56) References Cited

U.S. PATENT DOCUMENTS

| | | | |
|---|---|---|---|
| 9,977,912 B1* | 5/2018 | Kandamuthan | G06F 21/6218 |
| 2002/0144048 A1* | 10/2002 | Bolt | G06F 3/061 |
| | | | 711/4 |
| 2004/0044744 A1* | 3/2004 | Grosner | H04L 29/06 |
| | | | 709/217 |
| 2004/0078419 A1* | 4/2004 | Ferrari | H04L 29/06 |
| | | | 709/201 |
| 2004/0078467 A1* | 4/2004 | Grosner | G06F 17/30067 |
| | | | 709/226 |
| 2004/0117438 A1* | 6/2004 | Considine | G06F 11/2074 |
| | | | 709/203 |
| 2004/0133634 A1* | 7/2004 | Luke | G06F 11/2089 |
| | | | 709/203 |
| 2005/0050226 A1* | 3/2005 | Larson | H04L 63/083 |
| | | | 709/245 |
| 2005/0086427 A1* | 4/2005 | Fozard | G06F 3/0626 |
| | | | 711/111 |
| 2006/0112219 A1* | 5/2006 | Chawla | G06F 3/0607 |
| | | | 711/114 |
| 2006/0248294 A1* | 11/2006 | Nedved | G06F 11/1464 |
| | | | 711/162 |
| 2008/0147754 A1* | 6/2008 | Littlefield | H04L 67/1097 |
| 2008/0177806 A1* | 7/2008 | Cannon | G06F 11/1456 |
| 2008/0244032 A1* | 10/2008 | Gilson | G06F 3/061 |
| | | | 709/216 |
| 2010/0274825 A1* | 10/2010 | Nemoto | G06F 3/0605 |
| | | | 707/812 |
| 2010/0306412 A1* | 12/2010 | Therrien | H03M 7/3084 |
| | | | 709/247 |
| 2011/0225359 A1* | 9/2011 | Kulkarni | G06F 3/0607 |
| | | | 711/114 |
| 2012/0084523 A1* | 4/2012 | Littlefield | G06F 11/1469 |
| | | | 711/162 |
| 2012/0259815 A1* | 10/2012 | Olson | G06F 11/1458 |
| | | | 707/649 |
| 2014/0229695 A1* | 8/2014 | Dinkar | H04L 67/1004 |
| | | | 711/162 |
| 2015/0032691 A1* | 1/2015 | Hall | H04L 29/06 |
| | | | 707/610 |
| 2015/0106345 A1* | 4/2015 | Trimble | G06F 16/1748 |
| | | | 707/692 |
| 2016/0048408 A1* | 2/2016 | Madhu | G06F 11/1458 |
| | | | 718/1 |
| 2017/0011054 A1* | 1/2017 | Chennamsetty | G06F 17/30132 |
| 2017/0161286 A1* | 6/2017 | Eda | G06F 3/0647 |
| 2018/0067658 A1* | 3/2018 | Tripathy | G06F 3/0611 |
| 2018/0267856 A1* | 9/2018 | Hayasaka | G06F 3/0619 |

OTHER PUBLICATIONS

EMC Corporation, "Isilon OneFS Version 7.1 Backup and recovery guide," Copyright © 2013-2014 EMC Corporation, Published Mar. 2014, 82 pages.

EMC Corporation, "Isilon OneFS Version 8.0.0 Backup and recovery guide," Copyright © 2013-2014 EMC Corporation, Published Aug. 2016, 114 pages.

* cited by examiner

US 10,481,800 B1

NETWORK DATA MANAGEMENT PROTOCOL REDIRECTOR

TECHNICAL FIELD

The subject disclosure relates generally to a system and method for a network data management protocol (NDMP) redirector.

BACKGROUND

The large increase in amount of data generated by digital systems yearns for more sophisticated approaches to data storing, processing, and analyzing. In this context, scale-out network-attached storage (NAS) systems have proved popular as a technology for managing this "Big Data." Conventional NAS systems utilize a network data management protocol (NDMP) to move data between a primary storage device and a secondary storage device, for example, during data backup and/or restore. Typically, the NAS systems run on a set of heterogeneous hardware node configurations, wherein not all nodes within a cluster have access to Fibre-channel hardware devices that are utilized to run NDMP sessions. As the volume of NDMP sessions running on nodes that can access to the Fibre-channel hardware devices increases, the nodes are over utilized, leading to hardware resource constraints. While the Fibre-channel nodes are over utilized, the other non Fibre-channel nodes are not equipped to handle NDMP sessions.

The above-described background relating to file systems is merely intended to provide a contextual overview of some current issues, and is not intended to be exhaustive. Other contextual information may become further apparent upon review of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Example systems and methods disclosed herein relate to a network data management protocol (NDMP) redirector. In one example embodiment, a system is disclosed that comprises a processor and a memory that stores executable instructions that, when executed by the processor, facilitate performance of operations. Moreover, the operations comprise receiving, from a data management application, request data indicative of a request to initiate a NDMP session directed to a first network attached storage (NAS) node device of NAS node devices within a clustered file system. Further, the operations comprise: in response to the receiving, determining load data indicative of respective load factors of the NAS node devices, and based on the load data, selecting a second NAS node device of the network attached storage node devices to which the NDMP session is to be redirected.

Another example embodiment of the specification relates to a method that comprises receiving, by a first network attached storage node device of network attached storage node devices within a clustered file system, instruction data from a data management application to perform a network data management protocol (NDMP) session, wherein the first network attached storage node device comprises a processor. According to an aspect, the method further comprises in response to the receiving, analyzing load data indicative of a load associated with the network attached storage node devices; and based on the analyzing, directing the NDMP session to a second network attached storage node device of the network attached storage node devices.

Another example embodiment of the specification relates to a computer-readable storage medium comprising instructions that, in response to execution, cause a computing node device comprising a processor to perform operations, comprising determining that request data to initiate a network data management protocol (NDMP) session is transmitted from a data management application to a first network attached storage node device of network attached storage node devices within a clustered file system. The operations further comprise in response to the determining, analyzing load data indicative of a load associated with the network attached storage node devices and based on the analyzing, directing the NDMP session to a second network attached storage node device of the network attached storage node devices.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
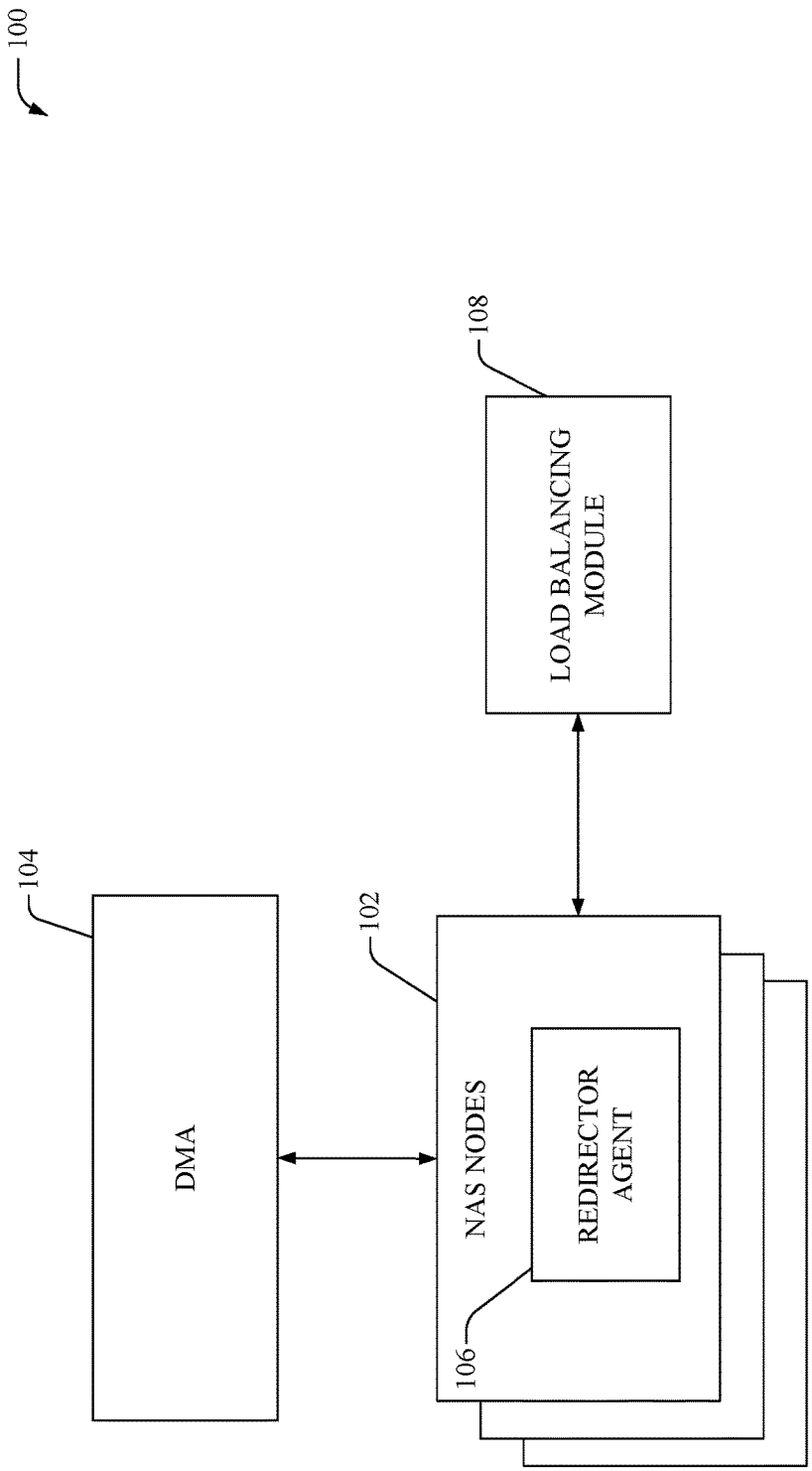
FIG. 1 illustrates an example system that facilitates redirection of network data management protocol (NDMP) sessions.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The term "cloud" as used herein can refer to a cluster of nodes (e.g., set of network servers), for example, within a distributed file storage system, that are communicatively and/or operatively coupled to each other, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with each other to provide resources for end-users.

Example systems and methods disclosed herein, in one or more embodiments, relate to a scale-out network attached storage (NAS) platform that combines modular hardware with unified software to harness unstructured data. In one aspect, the NAS platform can comprise a cluster of nodes that delivers a scalable pool of storage with a global namespace. The NAS platform's unified software provides centralized web-based and command-line administration to manage at least the following features: (i) a cluster that runs a distributed file system; (ii) scale-out nodes that add capacity and performance; (iii) storage options that manage files and tiering; (iv) flexible data protection and high availability; and/or (v) software modules that control costs and optimize resources.

According to an embodiment, data on the cluster can be transferred (e.g., copied or moved) between a primary storage device (e.g., NAS file servers) and a secondary storage device (e.g., tape device) by utilizing a network data management protocol (NDMP). NDMP defines a common architecture for the backup of network file servers and facilitates generation of a centralized common agent that can be utilized to backup data on file servers that run on different platforms. Accordingly, NDMP allows a separation of the data path and the control path, resulting in a decrease in network resource demands and provides an efficient mechanism for localized backups and/or disaster recovery. In conventional systems that do not utilize NDMP, administrators remotely mount the NAS volumes on their server and backup or restore the file data to a directly attached tape device. This can be a cumbersome method that results in an increase in network traffic and/or decrease in system performance. However, NDMP allows NAS nodes to communicate efficiently with a network-attached tape device for backup and/or recovery operations, for example, via a Fibre-channel card.

Referring initially to FIG. 1, there illustrated is an example system 100 that facilitates redirection of NDMP sessions, according to one or more aspects of the disclosed subject matter. Typically, NDMP is utilized by clustered NAS nodes 102 to backup and/or restore file data. As an example, the NAS nodes 102 can store large volumes of data, such as Big Data, which is typically mined for information and/or patterns. Big Data is characterized by the large amount of data, the different types of data, and/or the rate at which the data must be processed. For example, Big Data can refer to, but is not limited to, petabytes and/or exabytes of data, that need specialized approaches to storage and/or analysis. According to an aspect, the Big Data stored within NAS nodes 102 can include raw data and metadata associated with the raw data. A set of clients, for example, Network File System (NFS) clients (not shown), can connect (e.g., simultaneously and/or substantially simultaneously) to the NAS nodes 102 via a network interface to access the stored data. As an example, the clients can read, write, add, and/or delete data based on access privileges assigned to the clients.

In one embodiment, the NAS nodes 102 can comprise heterogeneous hardware node configurations, wherein not all of the NAS nodes 102 have access to Fibre-channel hardware devices that are utilized to run NDMP sessions. For example, a first set of the NAS nodes 102 can comprise purely storage nodes, a second set of the NAS nodes 102 can comprise backup accelerator nodes that do not have a disk/storage but comprise a Fibre-channel (FC) card that allows connection to a FC switch to access tape devices, and/or a third set of the NAS nodes 102 can comprise storage nodes that comprise an FC card that allows connection to the FC switch. Typically, only a portion of the NAS nodes 102 have access to Fibre-channel ports. As the number of NDMP sessions running on these nodes increases, the Fibre-channel nodes can be over utilized leading to hardware resource constraints. While the Fibre-channel nodes are over utilized, the other non Fibre-channel nodes are not equipped to handle NDMP sessions. System 100 provides a mechanism to redirect NDMP sessions to non Fibre-channel nodes from Fibre-channel nodes to balance NDMP load across a cluster of NAS nodes (e.g., NAS nodes 102) to achieve better load balancing and/or better resource utilization across the cluster.

According to an aspect, NDMP backups (and/or restores) for the NAS nodes 102 are coordinated by a data management application (DMA) 104 that runs on a backup server. As an example, the DMA 104 can be a third party application utilized by a client device(s) to schedule backups/restores. Typically, the DMA 104 latches onto an internet protocol (IP) address of one of the NAS nodes 102 and transmits all backup (and/or restore) requests to that particular node. For example, when the DMA 104 receives an instruction to perform a backup (and/or restore) from a client device, it communicates with a data server node (referred herein as a data server) and a mover node (referred herein as a mover) of the NAS nodes 102. Further, the DMA 104 can exchange IP information between the data server and the mover, which facilitates a connection between the data server and the mover. As an example, the data server is capable of reading file data from the NAS file system and forwarding the file data to the mover. The data server can typically be part of the NAS nodes 102 that has access to the file system (e.g., any general filer). Further, the mover, can typically comprise a backup accelerator, for example, a node (of the NAS nodes 102) that has access to a tape device (e.g., via a Fibre-channel connection). The mover can write the file data to the tape device during a backup operation. For restore operations, the mover can read file data from the tape device, transfer the file data to the data server, which in turn can write the file data to the NAS file system. It is noted that the NDMP sessions described herein are not limited to data backup and/or restore operations and can be utilized for other operations such as, but not limited to, data migration between clusters. Further, it is noted that the DMA 104 can typically communicate with multiple NAS nodes 102 (e.g., is not limited to communication with a particular node) and can perform multiple NDMP operations concurrently on the multiple NAS nodes 102.

Referring back to FIG. 1, a NDMP session request, transmitted by the DMA 104, can be received by a NAS node of the NAS nodes 102, which can utilize a redirector agent 106 to redirect the NDMP request to another node of the NAS nodes 102 that is determined to be better suited to handle the request. In one aspect, the other node can be selected based on an analysis of the state of the cluster, for example, based on load data determined by a load balancing module 108. From a protocol perspective, to avoid a break in the NDMP protocol, the DMA 104 cannot directly connect to the other node and perform the interactions. Instead, the NAS node that receives the request from the DMA 104, instantiates the redirector agent 106 that can receive requests from the DMA 104, setup a new connection with a new node (of the NAS nodes 102), relay the requests to the new node over the new connection, receive feedback from the new node, and forward the feedback back to the DMA 104. In one embodiment, if determined that the NAS node is well suited to handle the request (e.g., satisfies defined request processing criteria), the NAS node can determine that redirection is not required and can run the requested NDMP operation locally.

In one example, the NAS nodes 102 can include a node and cluster storage system such as an EMC® Isilon® Cluster that operates under the OneFS® operating system. It is noted that the NAS nodes 102 can include volatile memory(s) or nonvolatile memory(s), or can include both volatile and nonvolatile memory(s). Examples of suitable types of volatile and non-volatile memory are described below with reference to FIG. 10. The memory (e.g., data stores, databases) of the subject systems and methods is intended to comprise, without being limited to, these and any other suitable types of memory.

Figure 2:
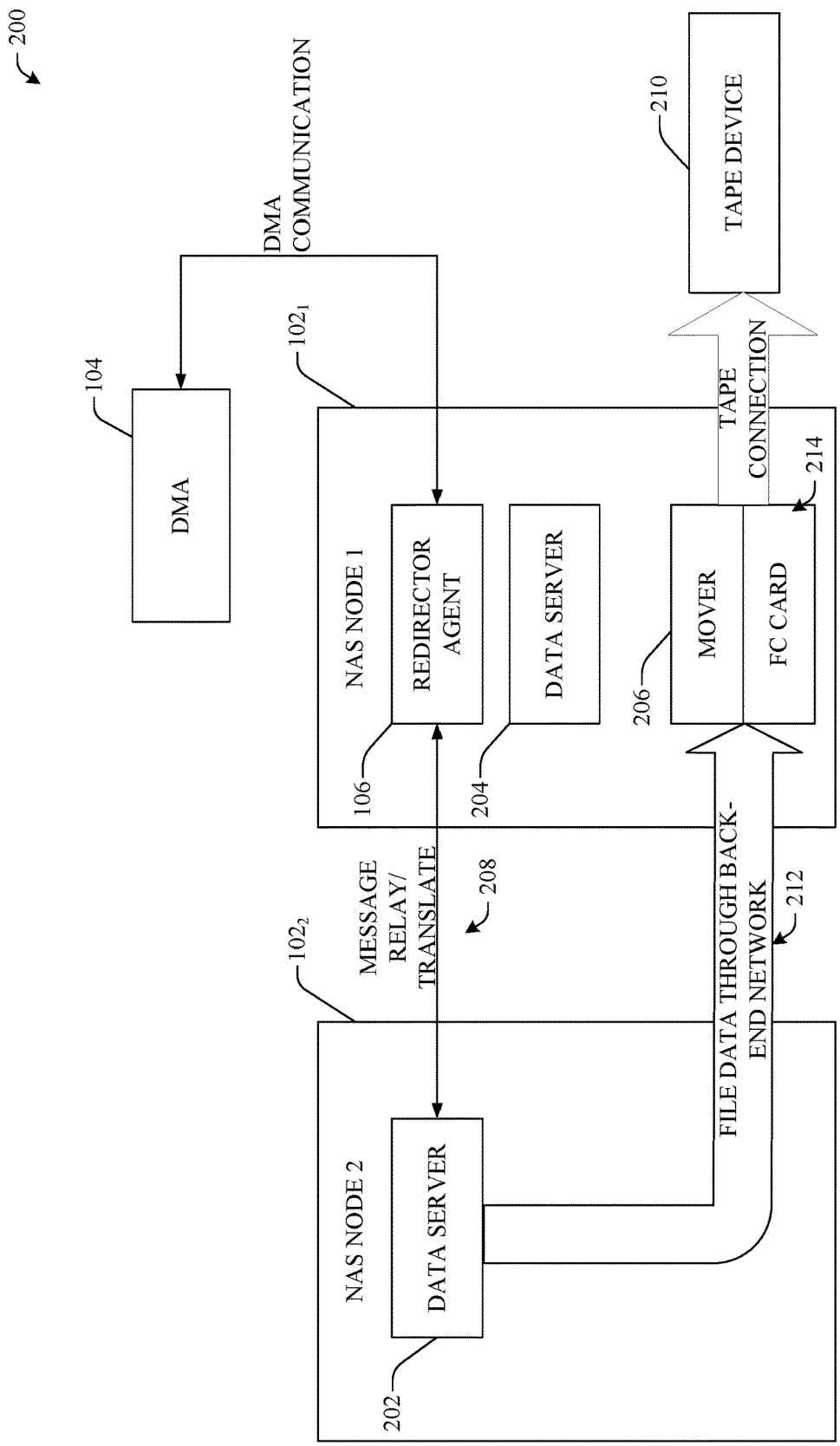
FIG. 2 illustrates an example system that facilitates a redirected 3-way NDMP session.

Referring now to FIG. 2, there is illustrated an example system 200 that facilitates a redirected 3-way NDMP session, according to an aspect of the specification. In one aspect, the system 200 can be utilized when redirecting NDMP sessions to NAS nodes that do not have access to a Fibre-channel port. It is noted that the DMA 104 and the redirector agent 106 can include functionality as more fully described herein, for example, as described above with regard to system 100. Further, its is noted that the NAS nodes 1-2 ($102_1$-$102_2$) are substantially similar to the NAS nodes 102 described with respect to system 100 and can include functionality as more fully described herein, for example, as described above with regard to the NAS nodes 102.

The DMA 104 can initiate a NDMP session with a node in the cluster, for example, NAS node 1 ($102_1$). In one aspect, on receiving the NDMP session request from the DMA 104, the NAS node 1 ($102_1$) can analyze a state of (e.g., load) one or more nodes in the cluster and can redirect the NDMP session to another available node (e.g., NAS node 2 ($102_2$)) within the cluster. When determined that the NDMP session is to be redirected, the NDMP session is converted to an agent NDMP session (e.g., redirector agent 106) that redirects commands received from the DMA 104 to a redirected session on the other node (e.g., NAS node 2 ($102_2$)).

In one aspect, the redirector agent 106 can intercept NDMP request messages provided by the DMA 104, and redirect the messages to other nodes (e.g., NAS node 2 ($102_2$)) within the cluster. When a session is initiated by the DMA 104 on a particular node (e.g., NAS node 1 ($102_1$)), the node (e.g., NAS node 1 ($102_1$)) can be a master NDMP message communication channel between DMA and the cluster. According to an aspect, the node (e.g., NAS node 1 ($102_1$)) can determine whether another node of the cluster is more suitable to run the NDMP session. Moreover, the determination can be based on one or more load balancing factors. For example, NAS node 1 ($102_1$) can select NAS node 2 ($102_2$) to run the NDMP session if determined that NAS node 2 ($102_2$) has more available resources and/or less load than that of NAS node 1 ($102_1$). On selection of the new node (e.g., NAS node 2 ($102_2$)), the NDMP session can be converted to the agent NDMP session (e.g., redirector agent 106). For the reminder life of the NDMP session, the redirector agent 106 can receive NDMP messages from the DMA 104 and then relay the NDMP messages to the redirected NDMP session on the new node (e.g., NAS node 2 ($102_2$)). When the redirected NDMP session responds, the redirector agent 106 can transfer the responses back to the DMA 104.

In the example scenario wherein the redirector agent 106 transfers the NDMP session to NAS node 2 ($102_2$), a redirected NDMP session can be run via NAS node 2 ($102_2$). The redirected NDMP session is a NDMP session whose DMA is an another node (e.g., NAS node 1 ($102_1$)) within the same cluster. In one aspect, the redirected NDMP session can be prohibited from further redirecting the NDMP session to another node (e.g., since the original NDMP session has already verified that NAS node 2 ($102_2$) has sufficient resources to run the NDMP session).

Two main component are utilized to handle a NDMP session, for example, a data server (202, 204) and a mover 206. The data server (202, 204) can perform data movement from storage systems to backup targets connected on the mover 206. The mover 206 can perform storing/retrieving data to/from a target device (e.g., tape device 210). As shown in FIG. 2, if a Fibre-channel port is not available in a redirected NDMP session (e.g., NAS node 2 ($102_2$) does not have access to a Fibre-channel port), the redirector agent 106 can redirect only the data server 202 to the redirected NDMP session (e.g., run via NAS node 2 ($102_2$)) and retain the mover 206 within the agent session (e.g., run via NAS node 1 ($102_1$)) to perform a redirected 3-way NDMP session (also known as a remote NDMP session). In addition to a NDMP message relay/translate channel 208, this workflow can utilize an additional data channel 212 between data server 202 and mover 206 to move file data from storage systems to the target tape device 210 via a port of a Fibre-channel card (FC card) 214. As an example, the NDMP message relay/translate channel 208 and the additional data channel 212 can be implemented via an internal backend network of the cluster. Further, it is noted that the subject specification is not limited to a tape device 210, but most any target device, such as, but not limited to, virtual tape libraries and/or cloud devices that are connected directly (or via Fibre-channel switch(es)) to the Fibre-channel ports of the mover 206, can be utilized. Furthermore, it is noted that mover 206 is not limited to be integrated to a tape device 210, but can be associated to most any other computer communication mechanisms, for example, a computer network device. In addition, although FIG. 2 depicts an example redirected 3-way NDMP session for a backup operation, it is noted that system 200 is not limited to backup operations and can be utilized for restore and/or data migration operations.

Figure 3:
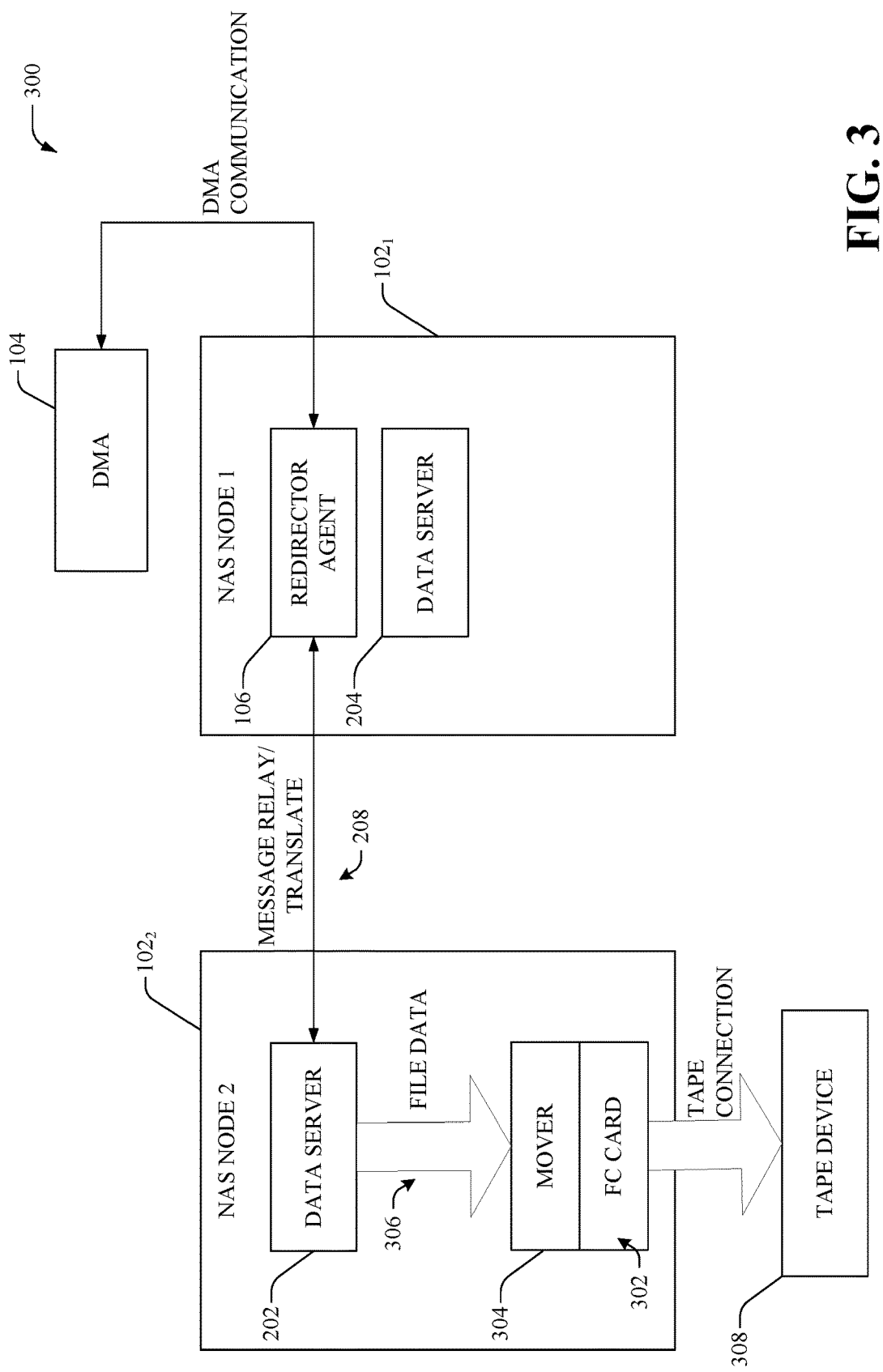
FIG. 3 illustrates an example system that facilitates a redirected local NDMP session.

FIG. 3 illustrates an example system 300 that facilitates a redirected local NDMP session, according to one or more aspects of the disclosed subject matter. In one aspect, the system 300 can be utilized when redirecting NDMP sessions to NAS nodes that have access to a Fibre-channel port. It is noted that the NAS node 1 ($102_1$), NAS node 2 ($102_2$), DMA 104, redirector agent 106, data server 202, data server 204, and NDMP message relay/translate channel 208, can include functionality as more fully described herein, for example, as described above with regard to system 100-200.

Similar to the NDMP session described above with respect to system 200, the DMA 104 can initiate a NDMP session with a node in the cluster, for example, NAS node 1 ($102_1$). In one aspect, on receiving the NDMP session request from the DMA 104, the NAS node 1 ($102_1$) can analyze a state of (e.g., load) one or more nodes in the cluster, for example, based on data received from a load balancing module 108, and can select a node (e.g., NAS node 2 ($102_2$)) in the cluster to which the NDMP session can be redirected. As an example, on selecting NAS node 2 ($102_2$), the NDMP session can be converted to an agent NDMP session (e.g., redirector agent 106) that can redirect commands received from the DMA 104 to the redirected session on NAS node 2 ($102_2$). Further, the agent NDMP session (e.g., redirector agent 106) can forward feedback received from the redirected NDMP session to the DMA 104.

In the example scenario wherein the redirector agent 106 transfers the NDMP session to NAS node 2 ($102_2$) that has access to Fibre-channel port (e.g., FC card 302), the redirected local NDMP session of the NAS node 2 ($102_2$) can host both the data server 202 and a mover 304 to perform a local NDMP session (a 2-way and/or direct NDMP session). In one aspect, the data server 202 can read file data and transfer the file data to the mover 304 locally/internally (as shown at 306). Further, the mover 304 can write the file data to a tape device 308. It is noted that the subject specification is not limited to a tape device 308, but most any target device, such as, but not limited to, virtual tape libraries and/or cloud devices, can be utilized.

Typically, when the data server 202 and the mover 304 run together and/or are hosted by the same NAS node, the data server 202 and the mover 304 can utilize common buffers (e.g., of NAS node 2 ($102_2$)) to increase efficiency. Accordingly, redirected local NDMP sessions can be more efficient than redirected 3-way NDMP sessions (e.g., described with respect to system 200). Further, although FIG. 3 depicts an example redirected local NDMP session for a backup operation, it is noted that system 300 is not limited to backup operations and can be utilized for restore and/or data migration operations.

Figure 4:
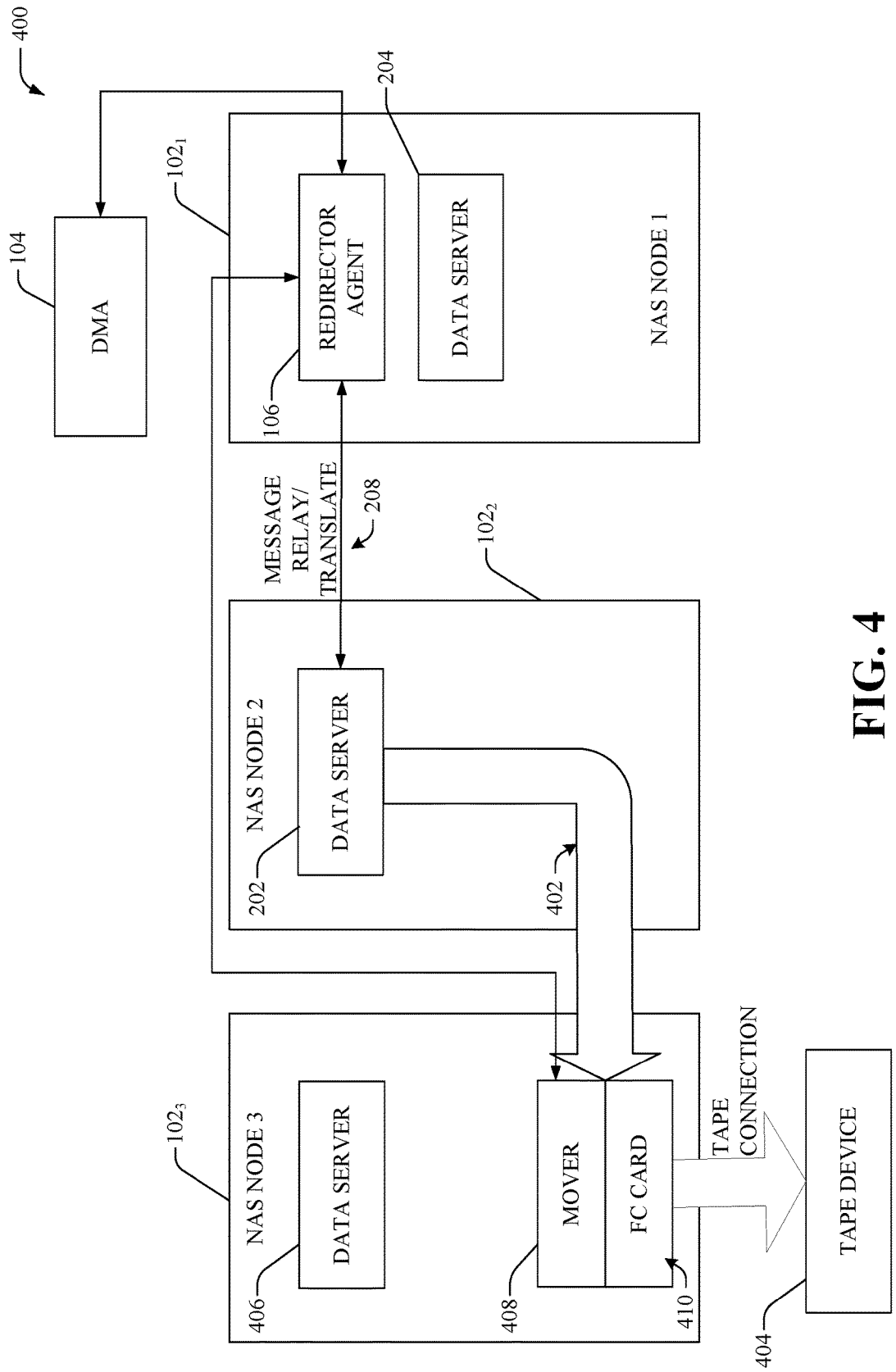
FIG. 4 illustrates an example system that provides another implementation for a redirected 3-way NDMP session.

Referring now to FIG. 4, there illustrated is an example system 400 that provides another implementation for a redirected 3-way NDMP session in accordance with an aspect of the specification. In one aspect, the system 400 can be utilized when redirecting NDMP sessions to NAS nodes that do not have access to a Fibre-channel port. It is noted that the NAS node 1 ($102_1$), NAS node 2 ($102_2$), DMA 104, redirector agent 106, data server 202, data server 204, and NDMP message relay/translate channel 208, can include functionality as more fully described herein, for example, as described above with regard to system 100. Further, its is noted that the NAS nodes 3 ($102_3$) is substantially similar to the NAS nodes 102, NAS node 1 ($102_1$), and/or NAS node 2 ($102_2$) described with respect to systems 100-300 and can include functionality as more fully described herein, for example, as described above with regard to the NAS nodes 102, NAS node 1 ($102_1$), and/or NAS node 2 ($102_2$).

Similar to the NDMP session described above with respect to systems 200-300, the DMA 104 can initiate a NDMP session with a node in the cluster, for example, NAS node 1 ($102_1$). In one aspect, on receiving the NDMP session request from the DMA 104, the NAS node 1 ($102_1$) can analyze a state of (e.g., load) one or more nodes in the cluster and can redirect the NDMP session to another available node (e.g., NAS node 2 ($102_2$)) in the cluster. When determined that the NDMP session is to be redirected, the NDMP session is converted to an agent NDMP session (e.g., redirector agent 106) that redirects commands received from the DMA 104 to the redirected session on the other node (e.g., NAS node 2 ($102_2$)). Further, the agent NDMP session can forward feedback received from the redirected NDMP session to the DMA 104.

The data server 202 can read file data and since a Fibre-channel port is not available within the NAS node 2 ($102_2$), the file data can be transferred, via a backend network of the cluster (as shown at 402), to most any other NAS node (e.g., NAS node 3 ($102_3$)) of the cluster that has access to a target tape device 404. The NAS node 3 ($102_3$) can comprise a data server 406 (substantially similar to data servers 202, 204) and a mover 408 (substantially similar to movers 206, 304) that has access to an FC card 410. In one example, the DMA 104 can specify/select the node, for example, NAS node 3 ($102_3$) that has access to a Fibre-channel port and that can host the mover 408. It is noted that although not shown in FIG. 4, the DMA 104 can also specify/select a device, external to the cluster (e.g., third party device) and that has access to the tape device 404, to host the mover instead of being hosted within the cluster. In this example scenario, the data server 202 can transmit the file data to the mover via most any external communication network that couples the cluster to the external device. Further, although FIG. 4 depicts an example redirected 3-way NDMP session for a backup operation, it is noted that system 400 is not limited to backup operations and can be utilized for restore and/or data migration operations.

Figure 5:
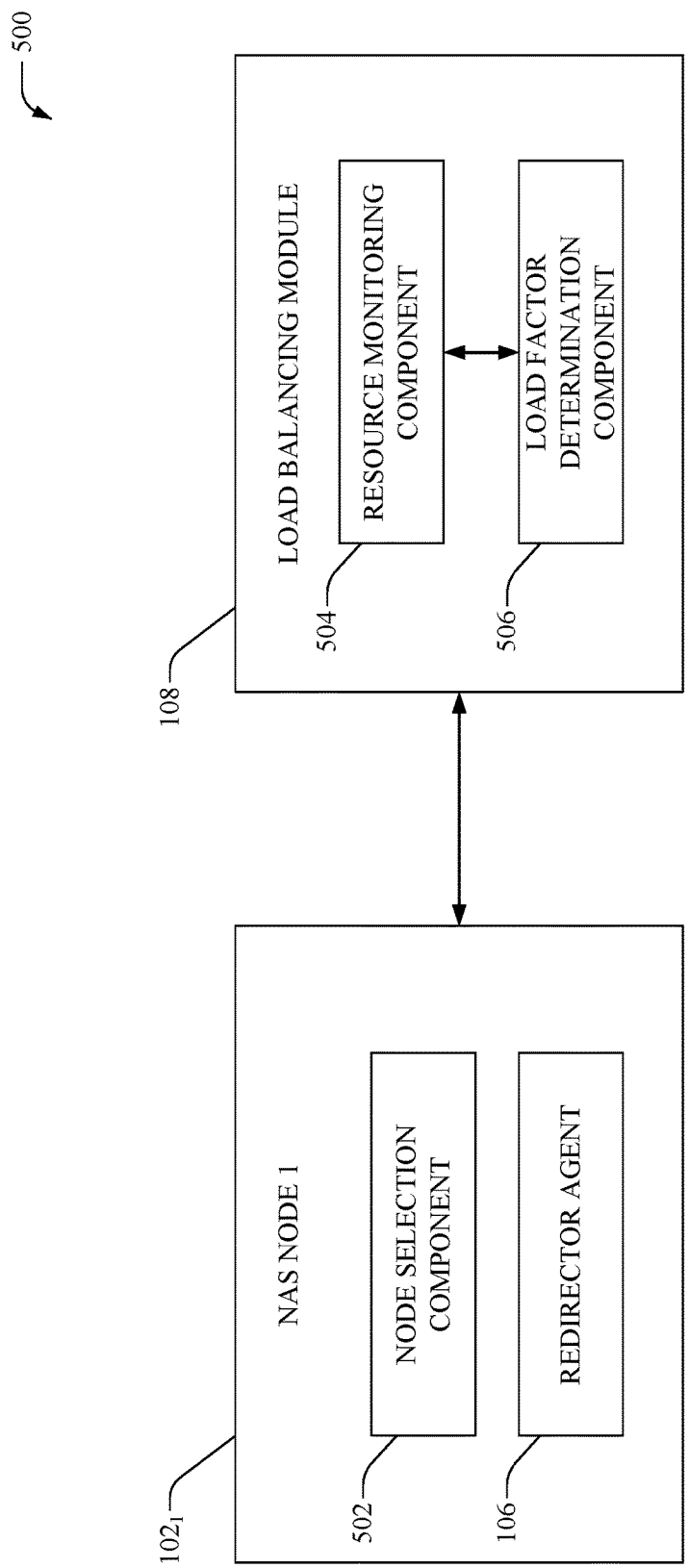
FIG. 5 illustrates an example system that is utilized for selecting a network attached storage (NAS) node for redirection of a NDMP session.

Referring now to FIG. 5, there illustrated is an example system 500 that is utilized for selecting a NAS node for redirection of a NDMP session, according to an aspect of the subject disclosure. It is noted that the NAS node 1 ($102_2$) and load balancing module 108 can include functionality as more fully described herein, for example, as described above with regard to system 100-400. As an example, the load balancing module 108 can be implemented by one or more NAS nodes of the cluster.

According to one aspect, on receiving a NDMP session initiation request, NAS node 1 ($102_2$) can perform resource-aware node selection for the redirector agent 106. In an example, a node selection component 502 can be utilized to determine a node that can handle the NDMP session more optimally than NAS node 1 ($102_2$), for example, based on an analysis of load data provided by the load balancing module 108 and/or one or more predefined policies/preferences. Redirection of the NDMP session can ensure that the NDMP session utilizes the cluster fairly to provide optimal performance and yet be aware of its resource usage, comply with performance rules, and operate well with other cluster workloads.

As an example, the load balancing module 108 can determine load factors for all (or some) nodes within the cluster and generate a ranked list of the nodes based on their load factors. In an aspect, a resource monitoring component 504 can monitor resource utilization (e.g., central processing unit (CPU) utilization and/or memory utilization, etc.) associated with the nodes during a given time interval (e.g., after every 5 seconds). As an example, resource monitoring component 504 can periodically query a matrix of nodes within the cluster to determine metrics, such as, but not limited to, CPU utilization, memory utilization and a number of NDMP sessions running on a node. Further, a load factor determination component 506 can determine load factors for each node based on the monitored data. For example, the load factor determination component 506 can calculate a CPU load factor, f(cpu), for a node as follows:

$$f(cpu) = \frac{cpu\_user\% + cpu\_sys\%}{max\_cpu} \quad (1)$$

Where, cpu_user % represents a percentage of CPU resources utilized in a user space, cpu_sys % represents a percentage of CPU resources utilized in a system space, and max_cpu represents maximum CPU resources of the node. In one example, the f(cpu) can additionally (or optionally) be determined based on the number of CPU cores of the node.

Further, the load factor determination component 506 can calculate a memory load factor, f(mem) for the node as follows:

$$f(mem) = 1 - \frac{free\_memory + inactive\_memory + cache\_memory}{max\_memory} \quad (2)$$

Where, the free_memory+inactive_memory+cache_memory represents the total available memory of the node and the max_memory represents the total memory of the node. It is noted that the load factors, f(cpu) and/or f(mem), can be determined at regular intervals for each node of the cluster.

The load factor determination component 506 can further determine a NDMP load factor (e.g., that represents an amount of workflow on the node that is being dedicated to NDMP sessions) as follows:

$$f(ndmp) = \frac{\#ndmp\_sessions}{max\_ndmp} \quad (3)$$

Where, #ndmp_sessions represents the number of NDMP sessions running on the node and the max_ndmp represents the maximum number of NDMP sessions that can run on the node (e.g., determined based on comparing the amount of memory required by one NDMP session and the total amount of memory available on the node). Based on (1), (2), and (3), the load factor determination component 506 can determine the node load factor, f(load), as:

$$f(load) = weight_{cpu} * f(cpu) + weight_{mem} * f(mem) + weight_{ndmp} * f(ndmp)$$

Where, the weights (weight$_{cpu}$, weight$_{mem}$, and/or weight$_{ndmp}$) can be adjusted based on most any cluster policies. As an example, weight$_{cpu}$=30%, weight$_{mem}$=40% and weight$_{ndmp}$=30%. Additionally or optionally, the f(cpu), f(mem), f(ndmp), and/or f(load) can be mapped to the closest load enumeration value, for example, f(load)=[0: Idle, 1: low, 2: normal, 3: high, 4: unavailable]. It is noted that the above provides example operations and that the subject disclosure is not limited to the above example operations for determining a load factor.

Based on the f(load) for each node, the load balancing module 108 can update a ordered list of nodes available to handle NDMP sessions. In one aspect, the node selection component 502 can utilize the list to select a node (e.g., NAS node 2 (102$_2$)), for example, having the least load factor and/or load enumeration value, to which the NDMP session is to be redirected via the redirector agent 106. Further, the node selection component 502 can utilize various policies/preferences to facilitate node selection. For example, a local node can be given preference if the difference between the load of the local node and the other nodes satisfies certain defined criterion (e.g., is less than a defined threshold). Accordingly, if the defined criterion is determined to be satisfied, the redirection of the NDMP session may be denied to avoid the overhead associated with the redirection to another node. In another example, if the load enumeration value(s) for any of the load metrics (e.g., f(cpu), f(mem), f(ndmp), and/or f(load)) of a node are determined to be "4: unavailable", the NDMP session is not redirected to that node. The above provides a few examples for policies/preferences utilized for node selection, however, it is noted that the subject specification is not limited to these examples and most any policies/preferences can be implemented.

Figure 6:
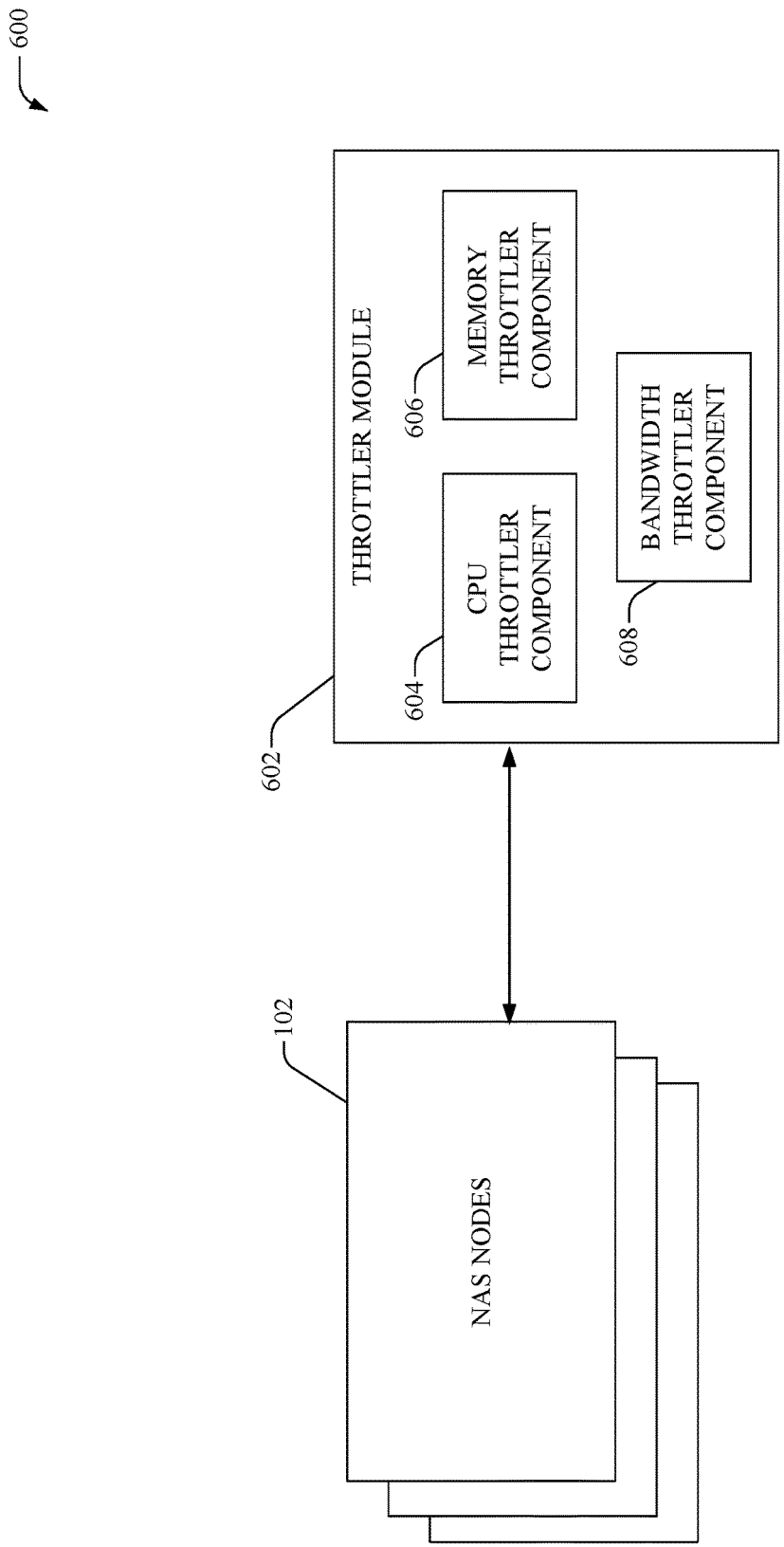
FIG. 6 illustrates an example system that facilitates throttling of NDMP sessions based on their resource utilization.

FIG. 6, there illustrated is an example system 600 that facilitates throttling of NDMP sessions based on resource utilization, according to an aspect of the subject disclosure. It is noted that the NAS nodes 102 can include functionality as more fully described herein, for example, as described above with regard to system 100. Redirected NDMP sessions running on other nodes (e.g., NAS node 102$_2$) can continuously monitor their resource utilization and the environment to be a good citizen with other modules in the cluster. To facilitate the monitoring, a throttler module 602 can track CPU and/or memory utilization of NDMP sessions per node. Additionally or alternatively, the throttler module 602 can track bandwidth of the backend network of the cluster that is utilized by redirected 3-way NDMP sessions cluster wide. In one example, since NDMP restore/recovery sessions run infrequently and are of high priority when they do run, the throttler module 602 can only monitor and control NDMP backup sessions. In one aspect, the throttler module 602 can be implemented by one or more NAS nodes of the cluster.

According to an embodiment, a CPU throttler component 604 can collect information from the NDMP sessions running on the NAS nodes 102 and determine a time period for executing each session. As an example, a maximum threshold of total CPU time to be used by NDMP sessions per node can be a defined percentage of the total CPU utilization per node. If the execution time period exceeds the maximum threshold, the CPU throttler component 604 can throttle the NDMP backup session. In general, throttling can comprise slowing down the NDMP backup session to reduce resource utilization. For example, the CPU throttler component 604 can issue one or more throttle signals in a round robin fashion to the overusing NDMP sessions, to reduce overall CPU utilization evenly.

In another embodiment, a memory throttler component 606 can collect information from the NDMP sessions running on the NAS nodes 102 and determine the amount of memory that is consumed by each NDMP session. As an example, a maximum threshold of total memory to be utilized by NDMP sessions per node can be a percentage of the total memory per node. If the memory consumed exceeds the maximum threshold, the memory throttler component 606 can throttle the NDMP backup session. For example, the memory throttler component 606 can determine a percentage by which the memory threshold is being exceeded and forward this percentage to the NDMP backup session as part of a throttle request. On receiving a throttle request that comprises the percentage, the NDMP backup session can reduce its high-water marks. The NDMP backup session can continue to send memory usage to the memory throttler component 606, which in turn can keep track of the percentage of memory used by the NDMP backup session, and throttle the NDMP backup session by dynamically adjusting high-water marks. In one example, the memory throttler component 606 can issue throttle signals in a round robin method to overusing NDMP sessions to reduce memory consumption evenly.

In yet another embodiment, a bandwidth throttler component 608 can determine a cumulative throughput of all redirected 3-way NDMP sessions in the cluster. If the cumulative throughput exceeds a defined bandwidth threshold, the bandwidth throttler component 608 can instruct one or more of the NDMP sessions to slow down. On receiving the request, the NDMP sessions can slow down a writer by inducing a sleep mode. As an example, the bandwidth throttler component 608 can issue throttle signals in a round robin method to the overusing NDMP sessions to free up backend bandwidth evenly. In addition, the throttler module 602 can actively monitor the usage of resources used by NDMP and throttle (e.g., reduce and/or slow down) the usage, if needed, for example, to comply with other customer workflows on the cluster.

Figure 7:
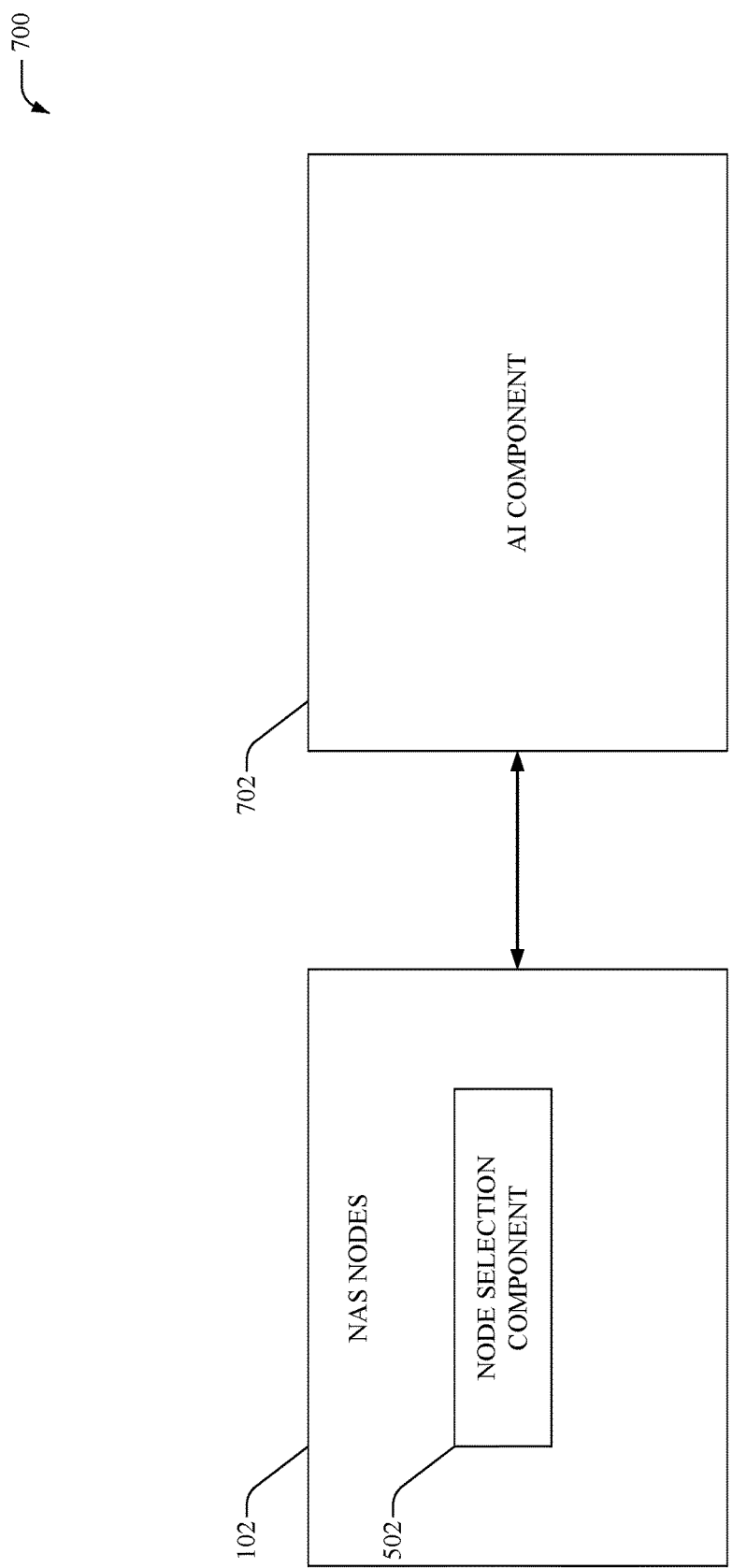
FIG. 7 illustrates an example system that facilitates automating one or more features in accordance with the subject embodiments.

Referring now to FIG. 7, there illustrated is an example system 700 that employs an artificial intelligence (AI) component (702) to facilitate automating one or more features in accordance with the subject embodiments. It can be noted that the NAS nodes 102 and node selection component 502 can comprise functionality as more fully described herein, for example, as described above with regard to systems 100, 500, and 600.

In an example embodiment, system 700 (e.g., in connection with automatically determining an optimal node for NDMP session redirection) can employ various AI-based schemes (e.g., intelligent processing/analysis, machine learning, etc.) for carrying out various aspects thereof. For example, a process for determining a node to which a NDMP session can be redirected can be facilitated via an automatic classifier system implemented by AI component 702. Moreover, the AI component 702 can exploit various artificial intelligence (AI) methods or machine learning methods. Artificial intelligence techniques can typically apply advanced mathematical analysis—e.g., decision trees, neural networks, regression analysis, principal component analysis (PCA) for feature and pattern extraction, cluster analysis, genetic algorithm, or reinforced learning—to a data set. In particular, AI component 702 can employ one of numerous methodologies for learning from data and then drawing inferences from the models so constructed. For example, hidden markov models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of service, type of device, etc.). For example, SVMs can be configured via a learning or training phase within a classifier constructor and feature selection module. Thus, the classifier(s) of AI component 702 can be used to automatically learn and perform a number of functions, comprising but not limited to determining according to a predetermined criteria, whether a NDMP session is to be redirected to another node, a NAS node to which a NDMP session is to be redirected, a frequency for monitoring load associated with resources of the cluster, whether a NDMP session is to be throttled, etc. The criteria can comprise, but is not limited to, historical patterns and/or trends, load data, administrator-defined preferences and/or policies, predicted traffic flows, event data, latency data, reliability/availability data, current time/date, and the like.

Figure 8:
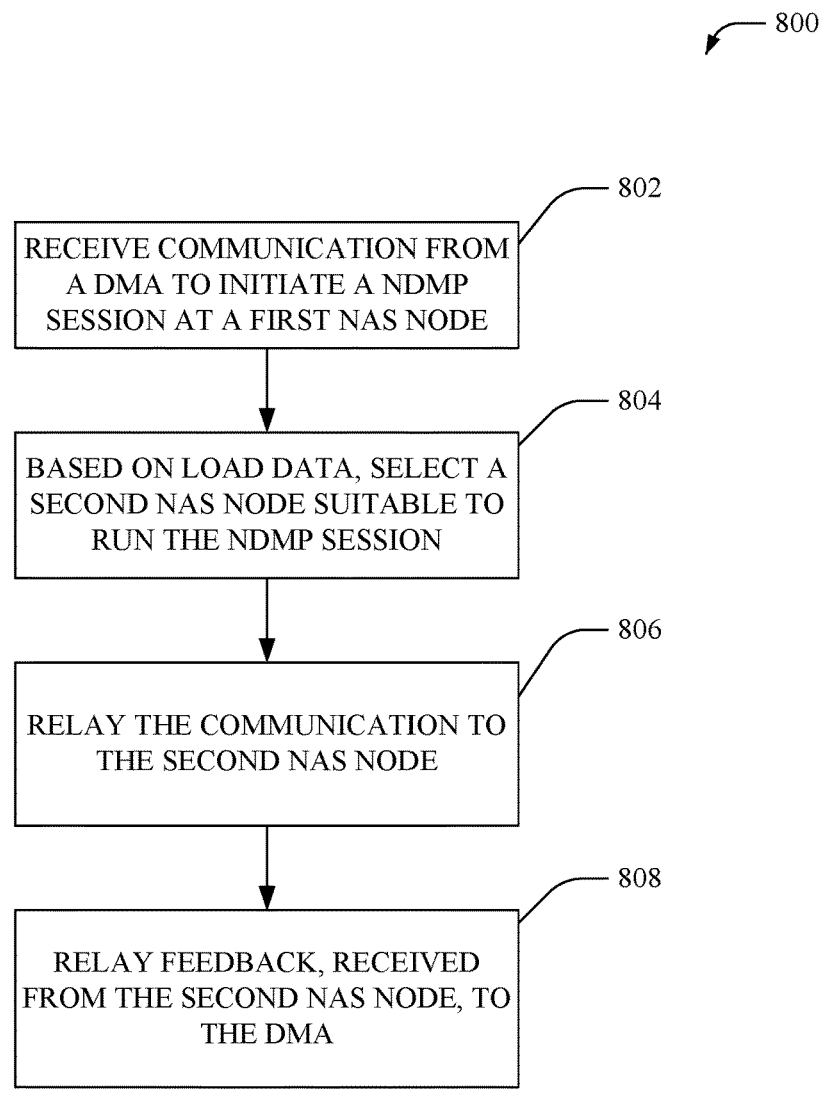
FIG. 8 illustrates an example method that facilitates redirection of NDMP sessions based on a current load of NAS nodes within a cluster.
Figure 9:
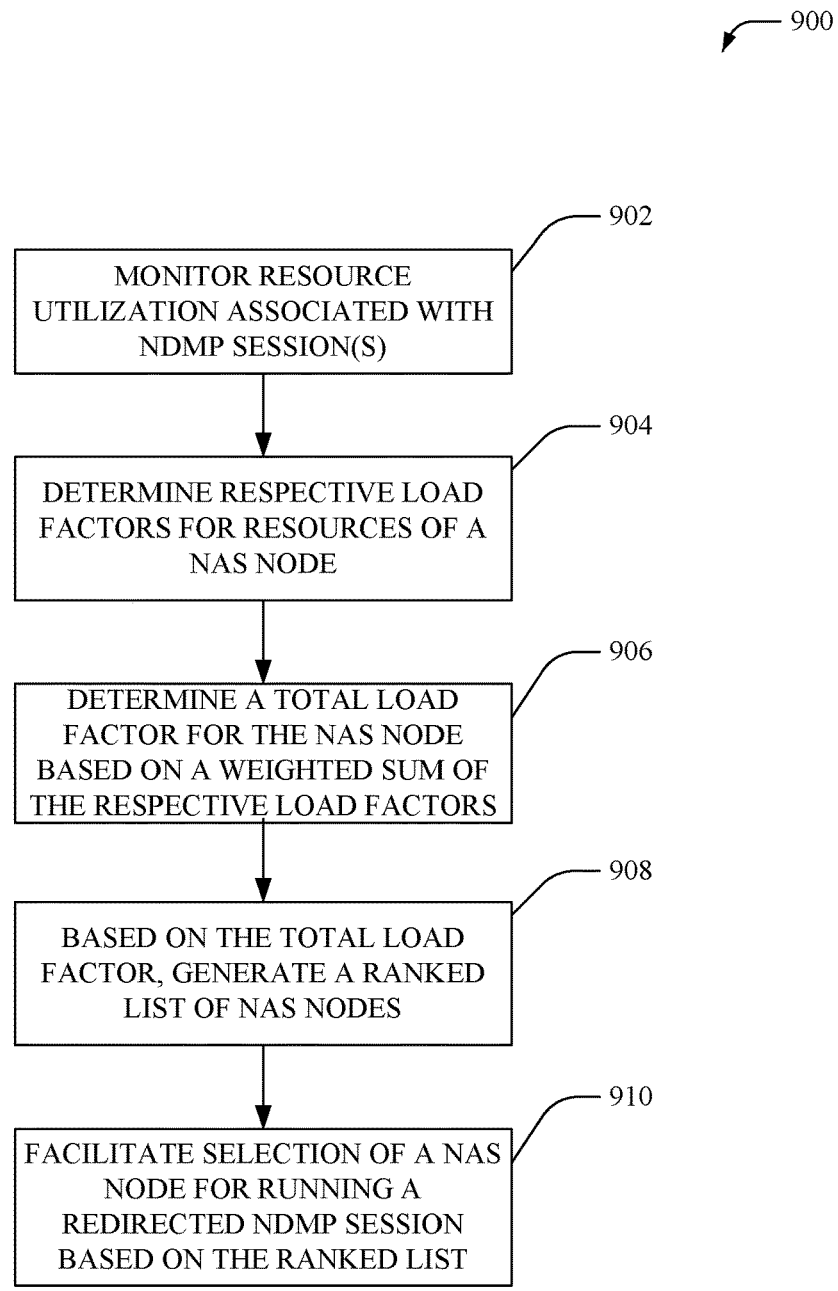
FIG. 9 illustrates an example method that facilitates dynamic node selection based on a system load.

FIGS. 8-9 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 8, there illustrated is an example method 800 that facilitates redirection of NDMP sessions based on a current load of NAS nodes within a cluster, according to an aspect of the subject disclosure. In one aspect, method 800 can be implemented by one (or more) of the NAS nodes. At 802, communication can be received from a DMA to initiate a NDMP session at a first NAS node. As an example, the NDMP session can comprise a backup and/or recovery/restore operation to transfer data been the storage system of the cluster and a tape device. At 804, based on load data, a second NAS node that is suitable to run the NDMP session can be selected. At 806, the communication can be relayed to the second NAS node. In one aspect, the second NAS node can instantiate a redirected NDMP session that can implement a data server that reads data from (and/or writes data to) the storage system and provides the data to a mover that has access to backup target devices (e.g., the tape device). The mover can read/write data to/from the backup target devices via a Fibre-channel connection. In one aspect, during a redirected local NDMP session, the mover can be implemented by the second NAS node. In another aspect, during a redirected 3-way NDMP session, the mover can be implemented by the first NAS node. Further, at 808, feedback received from the second NAS node can be relayed back to the DMA to avoid a break of the NDMP protocol.

FIG. 9 illustrates an example method 900 that facilitates dynamic node selection based on system load, according to an aspect of the subject disclosure. According to an aspect, method 900 can be implemented by one (or more) of the NAS nodes. At 902, resource utilization associated with NDMP session(s) running on NAS nodes in a cluster can be monitored. As an example, resource utilization can comprise, but is not limited to, CPU utilization, memory utilization, and/or a number of NDMP sessions running on a node. Further, at 904, respective load factors for resources of a NAS node. For example, a CPU load factor, a memory load factor, and/or a NDMP load factor (e.g., that represents an amount of workflow on the node that is being dedicated to NDMP sessions) can be determined (e.g., periodically). Furthermore, at 906, a total load factor can be determined for the NAS node, for example, based on a weighted sum of the respective load factors.

At 908, a ranked list of NAS nodes of the cluster can be generated based on the respective total load factors of the NAS nodes. Further, at 910, a selection of a NAS node for running a redirected NDMP session can be determined based on the ranked list. As an example, a NAS node with the lowest load and/or having greatest amount of available resources can be selected.

Figure 10:
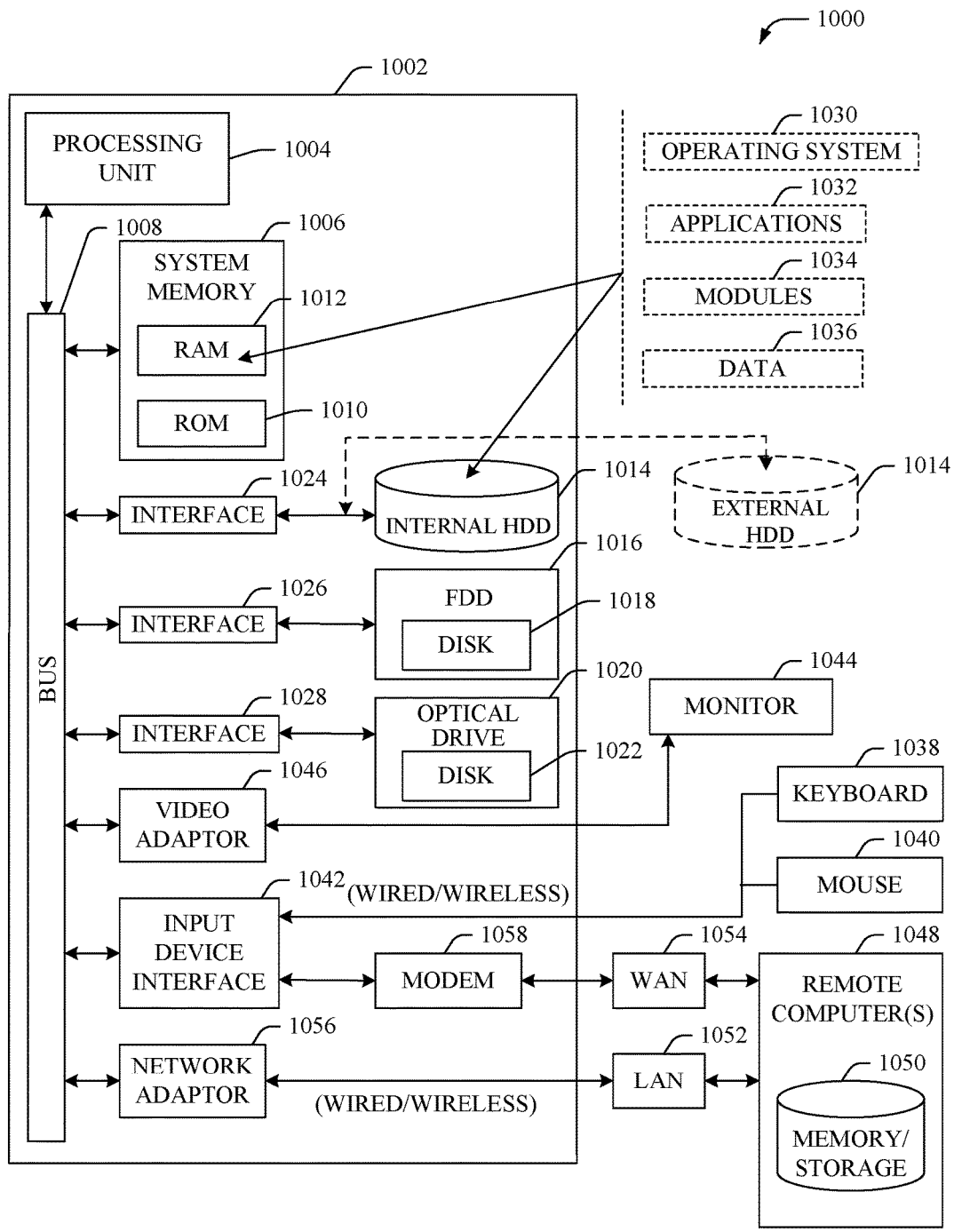
FIG. 10 illustrates a block diagram of an example computer operable to execute the disclosed file system architecture.

Referring now to FIG. 10, there is illustrated a block diagram of a computer 1002 operable to execute the disclosed file system architecture. In order to provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 10, the example environment 1000 for implementing various aspects of the specification includes a computer 1002, the computer 1002 including a processing unit 1004, a system memory 1006 and a system bus 1008. As an example, the component(s), server(s), node(s), cluster(s), system(s), driver(s), module(s), agent(s), and/or device(s) (e.g., NAS node(s) 102, NAS node 102$_1$-102$_3$, DMA 104, redirector agent 106, load balancing module 108, data server 202, data server 204, mover 206, tape device 210, mover 304, tape device 308, tape device 404, data server 406, mover 408, node selection component 502, resource monitoring component 504, load factor determination component 506, throttler module 602, CPU throttler component 604, memory throttler component 606, bandwidth throttler component 608, AI component 702, etc.) disclosed herein with respect to systems 100-700 can each include at least a portion of the computer 1002. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is noted that the specification can be implemented with various commercially available operating systems or combinations of operating systems.

A user can enter commands and information into the computer 1002 through one or more wired/wireless input devices, e.g., a keyboard 1038 and/or a pointing device, such as a mouse 1040 or a touchscreen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an infrared (IR) interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It is noted that the network connections shown are example and other means of establishing a communications link between the computers can be used.

The computer 1002 is operable to communicate with any wireless devices or entities operatively disposed in wireless communication, e.g., desktop and/or portable computer, server, communications satellite, etc. This includes at least WiFi and Bluetooth® wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at an 54 Mbps (802.11a) data rate, and/or a 2.4 GHz radio band at an 11 Mbps (802.11b), an 54 Mbps (802.11g) data rate, or up to an 600 Mbps (802.11n) data rate for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," "data storage," "database," "cache," and substantially any other information storage component relevant to operation and functionality of a component, refer to "memory components," or entities embodied in a "memory" or components comprising the memory. It is noted that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Furthermore, the terms "user," "consumer," "client," and the like are employed interchangeably throughout the subject specification, unless context warrants particular distinction(s) among the terms. It is noted that such terms can refer to human entities or automated components/devices supported through artificial intelligence (e.g., a capacity to make inference based on complex mathematical formalisms), which can provide simulated vision, sound recognition and so forth.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        receiving, from a data management application, request data indicative of a request to initiate a network data management protocol (NDMP) session directed to a first network attached storage node device of network attached storage node devices within a clustered file system, wherein the data management application is a third-party application utilized by a client device to schedule a data transfer operation,
        in response to the receiving, determining load data indicative of respective load factors of the network attached storage node devices, the load data comprising a ratio of a first number of NDMP sessions for a second network attached storage node device of the network attached storage node devices to a defined number of NDMP sessions for the second network attached storage node device; and based on the load data, selecting a second network attached storage node device of the network attached storage node devices to which the NDMP session is to be redirected, wherein as part of a redirection of the NDMP session, the first network attached storage node device forwards feedback data received from the second network attached storage node device to the data management application.

2. The system of claim 1, wherein the operations further comprise:

relaying communication data received from the data management application to the second network attached storage node device.

3. The system of claim 1, wherein the first network attached storage node device is a master NDMP message communication channel between the data management application and the clustered file system.

4. The system of claim 1, wherein the second network attached storage node device comprises a data server that at least one of reads data from or writes the data to a primary storage device of the clustered file system.

5. The system of claim 4, wherein a mover that at least one of reads the data from or writes the data to a tape device is to be implemented via the second network attached storage node device in response to determining that the second network attached storage node device comprises a Fibre-channel card.

6. The system of claim 4, wherein the operations further comprise:

implementing, via the first network attached storage node device, a mover that at least one of reads the data from or writes the data to a tape device in response to determining that the second network attached storage node device does not comprise a Fibre-channel card and that the first network attached storage node device comprises the Fibre-channel card.

7. The system of claim 6, wherein the data is transferred between the data server and the mover via a backend network of the clustered file system.

8. The system of claim 1, wherein the respective load factors are determined based on resource utilization of the network attached storage node devices.

9. The system of claim 1, wherein a first load factor of the respective load factors that has been assigned to the first network attached storage node device is determined to be greater than a second load factor of the respective load factors that has been assigned to the second network attached storage node device.

10. A method, comprising:

receiving, by a first network attached storage node device of network attached storage node devices within a clustered file system, instruction data from a data management application to perform a network data management protocol (NDMP) session, wherein the first network attached storage node device comprises a processor, and wherein the data management application is a third-party application utilized by a client device to initiate a data transfer operation;

in response to the receiving, analyzing load data indicative of a load associated with the network attached storage node devices, the load data comprising a ratio of a first number of NDMP sessions for a second network attached storage node device of the network attached storage node devices to a defined number of NDMP sessions for the second network attached storage node device; and based on the analyzing, directing the NDMP session to a second network attached storage node device of the network attached storage node devices, wherein the directing comprises transferring feedback data received from the second network attached storage node device to the data management application.

11. The method of claim 10, wherein the directing facilitates hosting, via the second network attached storage node device that has access to a primary storage device of the clustered system, a data server that reads file data stored within the primary storage device and transfers the file data to a mover device via a backend network link, and wherein the mover device is employable to write the information to a secondary storage device.

12. The method of claim 10, further comprising:

tracking a resource utilized by the NDMP session; and in response to determining that a throttling criterion has been satisfied, reducing a utilization of the resource by the NDMP session.

13. A non-transitory computer-readable storage medium comprising instructions that, in response to execution, cause a system comprising a processor to perform operations, comprising:

determining that request data to initiate a network data management protocol (NDMP) session is transmitted from a data management application to a first network attached storage node device of network attached storage node devices within a clustered file system, wherein the data management application is a third-party application employable by a client device to initiate a data transfer operation;

in response to the determining, analyzing load data indicative of a load associated with the network attached storage node devices, the load data comprising a ratio of a first number of NDMP sessions for a second network attached storage node device of the network attached storage node devices to a defined number of NDMP sessions for the second network attached storage node device; and based on the analyzing, directing the NDMP session to a second network attached storage node device of the network attached storage node devices, wherein the directing comprises transferring feedback data received from the second network attached storage node device to the data management application.

14. The non-transitory computer-readable storage medium of claim 13, wherein the directing comprises directing communication data received from the data management application to the second network attached storage node device.

15. The non-transitory computer-readable storage medium of claim 13, wherein the directing comprises directing the NDMP session to the second network attached storage node device in response to determining that the second network attached storage node device does not have access to a port of a Fibre-channel card.

16. The system of claim 1, wherein the load data comprises a ratio of: (i) a sum of a free memory of the second network attached storage node device, an inactive memory of the second network attached storage node device, and a cache memory of the second network attached storage node device to (ii) a maximum memory of the second network attached storage node device.

17. The system of claim 1, wherein the load data comprises a ratio of (i) a sum of a user processor utilization of the second network attached storage node device, and a system processor utilization of the second network attached storage node device to (ii) a maximum processor utilization of the second network attached storage node device.

18. The system of claim 1, wherein the load data comprises a weighting of a processor utilization of the second network attached storage node device, a memory utilization of the second network attached storage node device, and the ratio of the number of NDMP sessions for the second network attached storage node device of the network attached storage node devices to the maximum number of NDMP sessions for the second network attached storage node device.

19. The system of claim 1, wherein the first network attached storage node device redirects the NDMP session to the second network attached storage node device via a first communications channel, and wherein the operations further comprise:

the first network attached storage node device receiving a first data from the second network attached storage node device via a second communications channel that is separate from the first communications channel in response to the first network attached storage node device redirecting the NDMP session; and the first network attached storage device writing the first data to a secondary storage device.

20. The system of claim 1, wherein the operations further comprise:

the second network attached storage node device sending a first data to a third network attached node storage device in response to the first network attached storage node device redirecting the NDMP session; and the third network attached node storage device writing the first data to a secondary storage device.

* * * * *